United States Patent
Hayes et al.

[15] 3,653,725
[45] Apr. 4, 1972

[54] AUXILIARY VALVE FOR CONTROLLING MASTER CYLINDER BRAKE PRESSURE IN A VEHICLE BRAKING AND SKID CONTROL SYSTEM

[72] Inventors: Edward J. Hayes, Ann Arbor; William Stelzer, Milford, both of Mich.

[73] Assignee: Kelsey-Hayes Company, Romulus, Mich.

[22] Filed: May 5, 1969

[21] Appl. No.: 821,909

[52] U.S. Cl. ............................ 303/21 F, 188/181 A, 303/61, 303/68
[51] Int. Cl. ............................................. B60t 8/02
[58] Field of Search .................... 303/21, 6, 68–69, 303/61–63; 188/181

[56] References Cited

UNITED STATES PATENTS

| | | | |
|---|---|---|---|
| 3,449,019 | 6/1969 | Walker | 303/21 F |
| 3,325,226 | 6/1967 | Perrino | 303/21 |
| 3,401,986 | 9/1968 | Walker et al. | 303/21 |
| 3,415,577 | 12/1968 | Walker | 303/21 |
| 3,481,653 | 12/1969 | Grancon | 303/21 |

*Primary Examiner*—Milton Buchler
*Assistant Examiner*—John J. McLaughlin
*Attorney*—Harness, Dickey and Pierce

[57] ABSTRACT

An auxiliary valve adapted for operative association with a vehicle braking system having a vacuum operated power brake unit and a skid control mechanism incorporated therein, the valve having an inlet and outlet sections, a valve member movable between positions permitting and preventing the flow of air from the inlet to the outlet section, and an actuating means including an electrically energized solenoid operable in response to a control signal from the skid control system to selectively bias the valve member toward one of the aforesaid positions so as to control the flow of air to the power brake unit and thereby limit the output pressure from the master cylinder of the break system during a skid control cycle.

1 Claims, 1 Drawing Figure

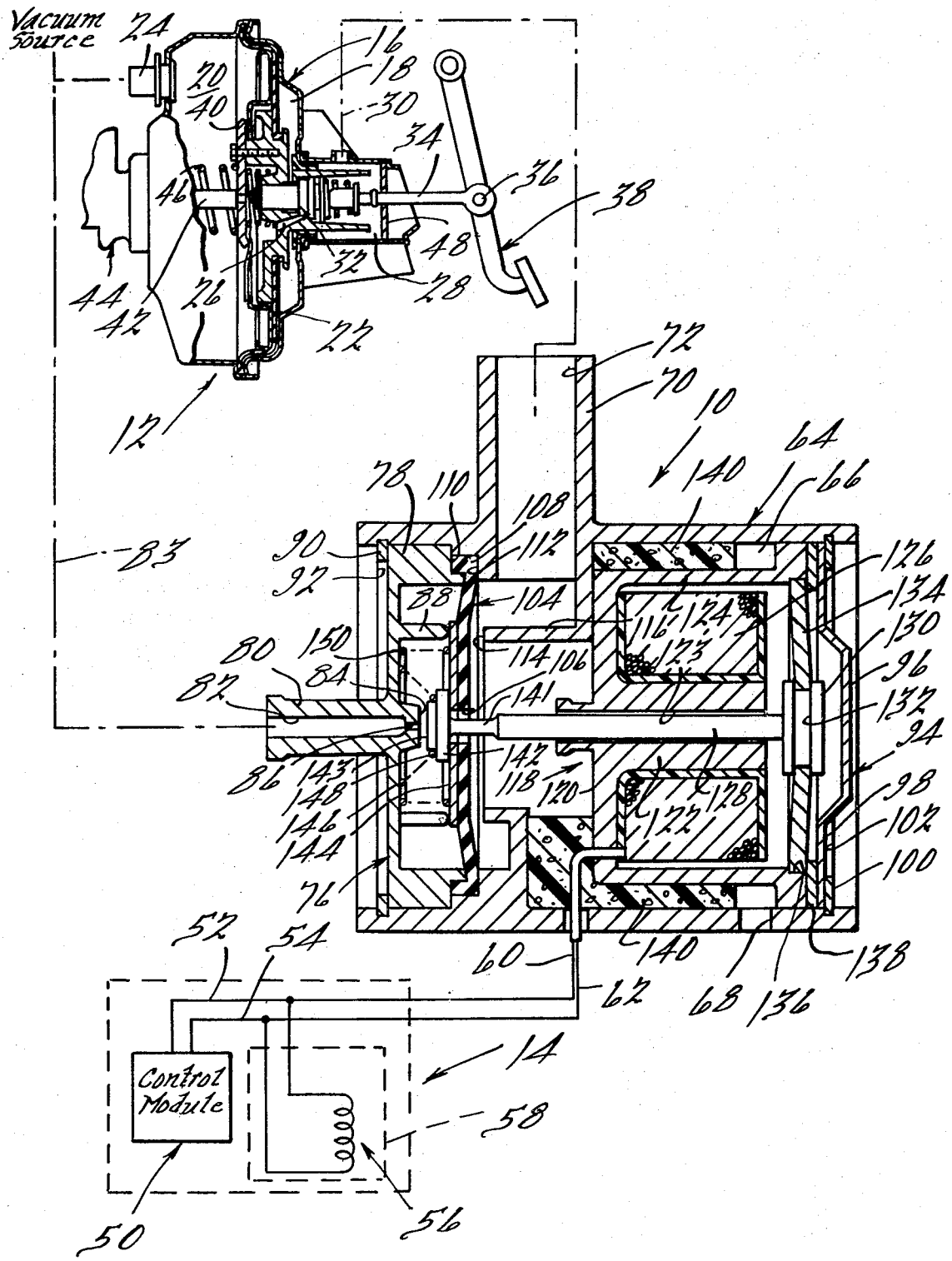

AUXILIARY VALVE FOR CONTROLLING MASTER CYLINDER BRAKE PRESSURE IN A VEHICLE BRAKING AND SKID CONTROL SYSTEM

BACKGROUND OF THE INVENTION

Under certain road conditions, application of maximum braking pressure results in wheel skidding and a locked-in wheel and/or skid condition. It has been theorized that the maximum coefficient of friction, i.e., the optimum braking efficiency, can be achieved when the vehicle wheels, instead of being in a totally locked or nonrotatable condition, are permitted to slip or partially rotate between 10 and 20 percent with such wheel slip being defined as the difference between the velocity of the vehicle ($V_c$) and the braked wheel velocity ($V_w$) with respect to the vehicle velocity ($V_c$), i.e., ($V_c - V_w$)/$V_c$.

Generally speaking, the present invention relates to a vehicle skid control system which is adapted to permit a controlled amount of wheel slippage during braking and thereby function in selectively controlling the vehicle braking system such that the operative characteristics thereof simulate, as close as possible, the ideal braking pressure at which the vehicle may be decelerated and stopped in a minimum amount of time. More particularly, the present invention is directed toward a novel auxiliary valve adapted to be operatively associated with vehicle braking systems including a vacuum operated power brake unit or booster and a skid control system of the type using a pressure control or modulating device for controlling the flow of hydraulic brake actuating fluid to the various brake wheel cylinders.

In general, the auxiliary valve is designed to prevent the vehicle operator from applying an increased brake pressure, via a power brake unit, during such time as skid control cycle is occurring and the skid control system is functioning to modulate (relieve) the brake pressure to the wheel cylinders. The auxiliary valve, in a broadest sense, is actuatable in response to and simultaneous with the skid control system to prevent or block the flow of air at atmospheric pressure to the power brake unit and hence render the unit substantially ineffective in increasing brake pressure during the skid control cycle. At such time as the cycle is completed, the auxiliary valve is deactuated so as to again communicate air to the power brake unit whereby said unit may thereafter become effective in controlling the hydraulic brake fluid pressure to the wheel cylinders. In a preferred construction, the valve is provided with a built-in time delay which prevents the brake unit from becoming effective until some preselected time after termination of the previous skid control signal, as will later be described in detail.

SUMMARY OF THE INVENTION

This invention relates generally to vehicular braking systems and, more particularly, to a new and improved auxiliary valve adapted to be used in cooperation with a vehicle skid control system and power brake unit for selectively rendering the power brake unit substantially ineffective in increasing the master cylinder hydraulic pressure during the operational cycle of the skid control system.

It is accordingly a general object of the present invention to provide a new and improved auxiliary valve unit for operative association with vehicle skid control systems and power brake units.

It is a more particular objection of the present invention to provide a new and improved valve unit of the above described type which is adapted to function in response to actuation of the skid control system in selectively controlling operation of the power brake unit to prevent increasing the brake fluid pressure in the associated vehicle wheel cylinders which are not being deenergized in the skid cycle.

It is another object of the present invention to provide a new and improved auxiliary valve of the above character which is of an extremely simple design, is economical to manufacture, and may be effortlessly assembled on the associated vehicle.

It is a further object of the present invention to provide a new and improved auxiliary valve unit of the above described type which may be operatively associated with virtually all types of vacuum operated power brake units.

It is still another object of the present invention to provide a new and improved auxiliary valve unit of the above character which is provided with a built-in time delay for preventing the associated power brake unit from becoming operable until some preselected time after termination of the prior operational cycle of the associated skid control system.

It is yet another object of the present invention to provide a new and improved auxiliary valve of the above character which may be operatively associated with various types of fluid pressure modulating type skid control systems, whereby to provide for universality of application.

It is yet another object of the present invention to provide a new and improved auxiliary valve of the above character which is adapted to be actuated in response to actuation of the associated skid control system.

Other objects and advantages of the present invention will become apparent from the following detailed description, taken in conjunction with the accompanying drawing.

BRIEF DESCRIPTION OF THE DRAWING

The FIGURE is a longitudinal cross sectional view of the auxiliary valve of the present invention, as shown in operative association with a typical fluid pressure operated power brake unit and a schematic representation of the vehicular skid control system.

DETAILED DESCRIPTION OF A PREFERRED EMBODIMENT

Referring now in detail to the drawing, an auxiliary control valve 10, in accordance with a preferred embodiment of the present invention, is shown in operative association with a vehicular power brake unit 12 and a skid control system representatively designated by the numeral 14. Generally speaking, the valve 10 is adapted to control the flow of ambient air to the power brake unit 12 in response to a control signal produced by the skid control system 14, whereby to render the unit 12 substantially ineffective in increasing the pressure in the associated master cylinder of the vehicle brake system during a skid control cycle at some preselected time after the termination of the skid control cycle, or after the termination of the control signal produced by the skid control system 14, the valve 10 will be opened again, thereby permitting ambient air to be communicated to the power brake unit 12, so as to render the unit 12 operable to further actuate the associated master brake cylinder to communicate hydraulic brake fluid to the vehicle wheel cylinders in the conventional manner. During the skid cycle, when the valve 10 is closed, the power booster force is maintained and cannot be increased even though the vehicle operator increases the pedal pressure, however, the increased manual force produces a slight increase in master cylinder pressure which is only a fraction of the increase in pressure if valve 10 were not used.

The power brake unit 12 may be of any suitable construction well known in the art, provided that the unit 12 is operable in response to a pressure differential across an internal valve or piston assembly therein, as is conventional in the power brake unit art. By way of example, the unit 12 may comprise a suitable external housing 16 defining a pair of motor chambers 18 and 20 which are separated by a flexible diaphragm member 22. The motor chamber 20 is communicable via a suitable vacuum line 24 with a source of vacuum pressure, such as the intake manifold of the associated vehicle engine. The motor chamber 18 is communicable via the valve 32 with the vacuum source and via a suitable passage 26 with an air chamber 28 formed at the opposite end of the housing 16 from the motor chamber 20, which air chamber 28 is communicable via a suitable air conduit 30 with the auxiliary valve 10, with a suitable valve assembly, generally designated 32 being provided interjacent the chambers 18 and 28 and being actuatable upon inward movement of a push rod 34 to communicate air from the chamber 28 into the chamber 18. As illustrated, the push rod 34 is connected through a suitable pivot 36 to a pivotable brake pedal 38. The diaphragm 22 is associated with a reciprocable piston member 40 having a force transmitting member 42 extending axially outwardly therefrom and adapted to effect actuation of an associated master cylinder 44 in a manner well known in the art. In operation of the power brake unit 12, the brake pedal 38 is depressed or biased toward the left in the drawing, thereby effecting inward movement of the push rod 34 which in turn effects opening of the valve assembly 32. When this occurs, the differential pressure across the diaphragm 22 will be such that the piston 40 will be biased toward the left due to the vacuum conditions in the chamber 20 and the relatively higher pressure conditions within the chamber 18. As the piston 40 thus moves, the member 42 will be biased toward the left, thereby actuating the master cylinder 44. When the brake pedal 38 is released, the valve assembly 32 will be closed, thereby blocking the flow of ambient air from the chamber 28 into the chamber 18, also admitting vacuum pressure from chamber 20 to chamber 18. A suitable return spring 46 being provided to effect retraction of the member 42 and piston 40 to the position shown in the drawing. As mentioned above, the auxiliary valve 10 may be operatively associated with virtually all types of differential air pressure operated power brake units, and one of which units that has been found to be highly satisfactory is shown and described in U.S. Pat. No. 3,237,525, issued Mar. 1, 1966, for Fluid Pressure Motor Mechanism, assigned to the assignee of this application, which patent describes in detail the construction and operation of the power brake unit 12 and is incorporated by reference herein in the descriptive portion of this application. It will be noted that the power brake unit 12 is substantially identical in construction to the unit shown and described in the aforesaid patent, with the exception of the provision of an air tight end wall 48 which blocks one end of the chamber 28 and necessitates that any air entering into the chamber 28 be communicated through the conduit 30.

The skid control system 14 with which the auxiliary valve 10 of the present invention is operatively associated, may be of any one of a wide variety of different designs adapted to modulate the fluid pressure to the vehicle brakes so as to simulate as closely as possible, the ideal braking pressure at which the vehicle may be decelerated and stopped in the shortest period of time. By way of example, the skid control system 14 may comprise an electrical control module 50 which is adapted to receive information as to the operation of the vehicle wheels and produce electrical signals responsive to the rotational velocity of the vehicle wheels. For example, the vehicle wheels may be provided with suitable sensors (not shown) which may be associated with the brake drums of the vehicle via suitable exciter rings (not shown), whereby during operation of the associated vehicle, the exciter rings would be rotated concomitantly with the brake drums, and hence simultaneously with the associated vehicle wheels, such that the sensors could produce electrical signals in response to the rotational velocity of the wheels. The control module 50 may be designed so as to sense the rate of change in the signals received from the sensors, and hence the rate of deceleration of the wheels, and to produce an output signal responsive to the magnitude of the deceleration of the wheels reaching a preselected magnitude corresponding to a skid condition existing or about to be occurring at the vehicle wheels. The output or control signal is adapted to be transmitted from the control module 50 through suitable conductors 52, 54 to an actuating solenoid or the like 56 of an associated modulating valve assembly 58 provided in the system 14. The output signal of the control module 50 may be either of an "on" or "off" type, or may be of a varying magnitude; however, for purposes of simplification, the output signal is preferably of substantially constant amplitude which permits the rest of the skid control system to be considerably simplified. In operation of the skid control system 14, the modulating valve assembly 58 will provide for a modulated brake pressure in response to actuation and deactuation of the solenoid 56 thereof, as is known in the art and is more particularly set forth and described in U.S. Pat. application. Ser. No. 783,794, Filed Dec. 16, 1968, for Skid Control System, which application is assigned to the assignee of the instant application and is incorporated by reference in the descriptive portion of this application. In the broadest sense, the auxiliary valve 10 of the present invention is adapted to be actuated in response to the control signal produced by the module 50 and accordingly, the valve 10 is communicated via conductors 60 and 62 to the conductors 52, 54, with the result that the initiation and termination of a control signal produced by the control module 50 will result in simultaneous actuation and deactuation of the solenoid 56, and hence the modulating valve assembly 58, and the auxiliary valve 10 embodying the principles of the present invention, and as will hereinafter be set forth in detail.

Referring now in detail to the construction and operation of the auxiliary valve 10 of the present invention, as illustrated in the drawing, the valve 10 comprises an annular housing 64 which defines an internal cavity 66 and is formed with a radially outwardly extending opening or passage 68 constituting an air inlet. Extending radially outwardly from the housing 64 is an annular sleevelike conduit section 70 which defines a central passage 72 constituting an air outlet which is communicable via the conduit 30 with the power brake unit 12. The left end of the housing 64 as viewed in the drawing is provided with a generally radially disposed end closure member 76 which comprises an enlarged thickness outer peripheral section 78 that is peripherally engaged with the inner surface of the cavity 66. The member 76 is formed with a central axially outwardly extending sleeve section 80 that defines a central axially extending passage 82 which is communicable with the aforementioned vacuum source through a suitable vacuum line representatively designated by the numeral 83. The inner end of the section 80 defines a generally flat, radially extending valve seat or face 84 and is formed with a reduced diameter passage or orifice 86 that is communicable at one end with the interior of the passage 82 and at the opposite end with the internal of the cavity 66. Spaced radially outwardly from the section 80 is an annular, axially inwardly extending stop section or shoulder 88, the inner end of which terminates axially inwardly from the valve face 84 and functions in a manner hereinafter to be described. The member 76 is retained within the end of the housing 64 by means of an annular retaining ring 90 which is disposed within a radially outwardly extending annular recess 92 formed around the inner periphery of the cavity 66, as illustrated.

The end of the housing 64 opposite the member 76 is closed by a generally radially disposed cover plate 94 which is formed with an outwardly convex central section 96 and a generally radially disposed outer peripheral section 98 which extends into abutting engagement with the periphery of the cavity 66. The cover plate 94 is secured in place by means of an annular retaining ring 100 which is disposed within an annular, radially outwardly extending recess 102 formed around the periphery of the cavity 66.

Disposed interiorly of the housing 64 at a position adjacent the inner side of the end closure member 76 is a generally radially extending, resilient, flexible valve member 104. The member 104 may be fabricated of rubber or any other suitable resilient flexible material, as will be apparent, and defines a central opening 106 which is coaxially aligned with the orifice 86. The outer periphery of the valve member 104 is formed with an enlarged thickness portion 108 which is adapted to be compressingly engaged between a pair of radially extending shoulders 110 and 112 formed around the inner side of the closure member 76 and the housing 64, respectively, the portion 108 thereby serving to operatively position the valve member 104 and providing a fluid tight seal or gasket means between the confronting portions of the housing 64 and end closure member 76. The inner side of the valve member 104 is adapted to sealingly engage an annular valve seat 114 defined by an annular, axially extending section 116 of the housing 64, whereby to block communication between the interior of the cavity 66 and the passage 72, as will later be described.

Located directly inwardly or interiorly of the cover plate 94 is an actuating solenoid assembly 118 which comprises a solenoid winding support member 120 having a central collar section 122 defining an axially extending bore or passage 123. The member 120 also comprises an annular side wall section 124 that is spaced radially outwardly from the section 122 and cooperates therewith in operatively supporting a plurality of solenoid windings, generally designated 126, which are connected in the conventional manner to the conductors 60, 62 in order to effect energization of the assembly 118. The assembly 118 further comprises an elongated, generally cylindrically shaped plunger member 128 which is fabricated of a nonmagnetic material and is reciprocally disposed within the passage 123. Disposed on the end of the plunger member 128 adjacent the cover plate 94 is an annular retaining element 130 which defines a radially inwardly extending annular recess 132 around the periphery thereof. The recess 132 is adapted to operatively receive the inner ends of a plurality of radially outwardly extending, circumferentially spaced, spoke like elements or segments 134, the outer ends of which are retained within an annular recess 136 defined around the section 124 of the member 120 by means of an annular or ring-shaped member 138 which is disposed adjacent the cover plate 94 and support member 120, as illustrated. The elements 130 and 134 are fabricated of a ferromagnetic material, and the elements 134 are designed so as to pivot somewhat, whereby to permit the element 130 to move toward and away from the adjacent end of the support member 120 upon energization of the windings 126, as will be apparent. Disposed between the outer periphery of the member 120 and the inner periphery of the cavity 66 is a suitable air filter member 140 which, by way of example, may be fabricated of an open-celled urethane foam or a similar material adapted to effectively filter contaminants from the ambient air passing through the cavity 66 between the inlet 68 and outlet 72.

The end of the plunger member 128 opposite that which is connected to the element 130 is formed with a neck-down or reduced diameter section 141 and has a radially outwardly extending valve section 142 formed on the terminal end thereof. The valve section 142 defines a flat, radially extending valve face 143 which is adapted to abuttingly engage the face 84 to block the flow of vacuum pressure from the vacuum line 83 to the interior of the cavity 66, as will be described. A generally flat or disc-shaped reinforcing plate or member 144 is bonded to the valve member 104, the member 144 being engageable with the inner end of the stop section 88 of the closure member 76 for limiting axial movement of the valve member 104 toward the adjacent end of the housing 64, as will be described. It will be noted that the side of the valve section 142 opposite the valve face 143 serves a valve function in closing the opening 106 when the section 142 is abuttingly engaged with the confronting side of the reinforcing member 144. A generally conically shaped spring member 146 is provided interjacent the valve section 142 and the inner side of the closure member 76, the spring 146 tapering radially inwardly toward the interior of the cavity 66 and being engageable with an annular recess or shoulder 148 formed around the periphery of the valve section 142. A second spring 150 is provided circumjacent the outer periphery of the spring 146 and abuts at one end against the inner side of the member 76 and at the opposite end against the exterior side of the member 144, for purposes hereinafter to be described.

In operation of the auxiliary valve 10 of the present invention, assuming that the vacuum line 83 is connected to a suitable source of vacuum pressure, the valve member 104 will normally be disposed in the position illustrated due to the differential pressure across the member 104, i.e., vacuum pressure on the exterior side of the member 104 and ambient air pressure on the interior side thereof. Accordingly, the valve member 104 will be spaced axially away from the valve seat 114, whereby to permit ambient air to flow from the inlet 68, through the filter member 140 and thereafter into the outlet 72 to the power brake unit 12 via the conduit 30. The plunger member 128 is normally disposed in the position shown in the drawing, whereby the spring 146 resiliently maintains the face 143 spaced inwardly or away from the face 84 to permit the vacuum conditions within the line 83 to be freely communicated to the exterior side of the valve member 104. At such time as skid control cycle is initiated, the control signal produced by the module 50 is transmitted to the assembly 118 via the conductors 60, 62, resulting in energization of the assembly 118. When this occurs, the plunger member 128 is biased toward the left in the drawing due to the magnetic attraction of the element 130 to the adjacent end of the support member 120, resulting in the face 143 of the valve section 142 being biased into engagement with the face 84 against the resistance of the spring 146, thus blocking the communication of vacuum pressure into the portion of the cavity 66 adjacent the exterior side of the valve member 104. As the plunger member 128 thus moves toward the left, the interior side thereof will move away from the exterior side of the member 144, whereby the ambient air conditions prevalent within the cavity 66 will be communicated through the annulus defined between the periphery of the opening 106 and the necked-down section 141 of the member 128 to the exterior side of the valve member 104, with the result that the pressure on the interior and exterior sides of the valve member 104 will equalize. When this occurs, the spring 150 becomes effective to resiliently bias the valve member 104 axially inwardly into engagement with the valve seat 114 which blocks the flow of air from within the cavity 66 to the air outlet 72, and hence no air will be communicated to the chamber 28 of the power brake unit 12 so as to prevent an increase in booster force provided by the unit 12.

At such time as the control signal from the module 50 is terminated, the windings 126 of the assembly 118 will be deenergized, whereby the coil spring 146 will function to bias the plunger member 128 axially toward the right in the drawing, resulting in the face 143 moving out of engagement with the face 84 so that the vacuum conditions within the line 83 will be communicated into the interior of the left end of the cavity 66. When this occurs, a differential pressure condition will exist across the valve member 104 as a result of the ambient conditions on the interior side thereof and the vacuum conditions on the exterior sides thereof, resulting in the valve member 104 being biased axially outwardly to a position wherein the member 144 abuts against the stop section 88, with the further result that the valve member 104 is moved out of engagement with the valve seat 114 so that ambient air can again be communicated from the intake 68 to the outlet 72 and hence to the power brake unit 12 so that said unit may function in its normally intended manner.

Due to the fact that the skid cycle terminates at a preselected time after the control signal ends, it is desirable that the auxiliary valve 10 be provided with a time delay means. While a wide variety of different types of time delay devices could be conceivably used in this application, for example, electrical delay relays and the like, it has been found that the provision of the orifice 86 accomplishes the intended delay function at minimum amount of expense and structural modification to the auxiliary valve 10. In particular, it will be seen that upon deenergization of the assembly 118, the plunger member 128 will move toward the right in the drawing, thereby biasing the face 143 of the valve section 142 away from the face 84 to permit the vacuum conditions within the line 83 to be communicated into the interior of the left end of the cavity 66. Due to the restricted size of the orifice 86, when the face 143 moves away from the face 84, vacuum conditions are communicated into the cavity 66 at a controlled or relatively slow rate, thereby causing the valve member 104 to move away from the valve seat 114 at a relatively slow rate (in terms of milliseconds) so that after termination of the control signal from the module 50, ambient air is temporarily prevented from being communicated to the outlet 72 from the inlet 68, thus accomplishing the desired delay function.

It will be seen from the above description that the present invention provides a novel auxiliary valve which is of an extremely simple design, yet will be positive in action in preventing the vehicle operator from causing an increase in hydraulic braking pressure, via the power brake unit 12, during a skid control cycle of the associated skid control system. By virtue of the fact that the auxiliary valve 10 may be fabricated of readily available component parts, it may be economically manufactured and easily assembled in existing vehicles having associated skid control systems and power brake units such as the unit 12. Moreover, the provision of the orifice 86 functioning to selectively control the ingress of vacuum conditions into the cavity 66 will adapt the auxiliary valve 10 for use in operative association with skid control systems wherein it is desired to delay the operation of the power brake unit for some period of time after termination of a skid control cycle, which delay function is accomplished with a minimum amount of expense.

While it will be apparent that the preferred embodiment illustrated herein is well calculated to fulfill the objects above stated, it will be appreciated that the present invention is susceptible to modification, variation and change without departing from the scope of the invention.

We claim:

1. In combination with a vehicle braking system including a master cylinder and at least two wheel cylinders,
   a skid control system including a modulating valve assembly for controlling the fluid pressure supplied to the brake wheel cylinders and means for producing an electrical control signal in response to the presence of a skid condition,
   a vacuum operated power brake unit for actuating the master cylinder,
   valve means responsive to the control signal for controlling actuation of said power brake unit,
   said valve means comprising a valve member movable between first and second positions opening and closing a flow path of air to said brake unit,
   a vacuum source,
   means communicating said source with one side of said valve member,
   a plunger member opening and closing a path between said vacuum source and said valve member, whereby said valve member is movable to an open position when said path to said vacuum source is open and said valve member is movable to a closed position when said path to said vacuum source is closed,
   delay means for moving said valve member from a closed position to an open position at some preselected time after said flow path to said vacuum source is opened,
   said delay means comprising a restricted orifice communicating said vacuum source with one side of said valve member, and
   means actuable substantially simultaneously with operator of said skid control system for operating said plunger member.

* * * * *